(12) United States Patent
Brown et al.

(10) Patent No.: US 7,447,331 B2
(45) Date of Patent: Nov. 4, 2008

(54) SYSTEM AND METHOD FOR GENERATING A VIEWABLE VIDEO INDEX FOR LOW BANDWIDTH APPLICATIONS

(75) Inventors: Lisa Marie Brown, Pleasantville, NY (US); Jonathan H. Connell, Cortlandt Manor, NY (US); Raymond A. Cooke, Bloomington, MN (US); Arun Hampapur, Fairfield, CT (US); Sharathchandra UmapathiRao Pankanti, Mount Kisco, NY (US); Andrew William Senior, New York, NY (US); Ying-Li Tian, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1003 days.

(21) Appl. No.: 10/785,890

(22) Filed: Feb. 24, 2004

(65) Prior Publication Data

US 2005/0185823 A1    Aug. 25, 2005

(51) Int. Cl.
*G06K 9/00* (2006.01)
*H04N 5/225* (2006.01)
(52) U.S. Cl. .................................. 382/103; 348/169
(58) Field of Classification Search ................ 382/103, 382/107, 154, 194, 224, 243, 142; 348/143, 348/169, 700; 375/241.1, E7.004, E7.011, 375/E7.012, E7.076, E7.078; 380/212
See application file for complete search history.

(56) References Cited

U.S. PATENT DOCUMENTS

| | | | |
|---|---|---|---|
| 5,521,841 A | 5/1996 | Arman et al. ........... 364/514 A |
| 5,923,365 A * | 7/1999 | Tamir et al. .................. 348/169 |
| 5,933,535 A | 8/1999 | Lee et al. ..................... 382/243 |
| 5,969,755 A * | 10/1999 | Courtney ..................... 348/143 |
| 6,026,183 A | 2/2000 | Talluri et al. ................ 382/194 |
| 6,169,573 B1 | 1/2001 | Sampath-Kumar et al. .. 348/169 |
| 6,173,317 B1 * | 1/2001 | Chaddha et al. ............. 709/219 |

(Continued)

OTHER PUBLICATIONS

Kompatsiaris et al., "Spatiotemporal Segmentation and Tracking of Objects for Visualization of Videoconference Image Sequences", IEEE Transactions on Circuits and Systems for Video Technology, Ieee Inc., New York, vol. 10, No. 8, Dec. 2000, pp. 1388-1402.

(Continued)

*Primary Examiner*—Abolfazl Tabatabai
(74) *Attorney, Agent, or Firm*—Duke W. Yee; Anne Dougherty; Brandon G. Williams (57) ABSTRACT

A system and method for generating a viewable video index for low bandwidth applications are provided. The exemplary aspects of the present invention solve the problems with the prior art systems by incorporating information for generating a viewable representation of the video data into the index, thus generating a viewable video index. The viewable video index contains information for generating a visual representation of moving objects in the video data, a visual representation of the background of the video capture area, i.e. the scene, a representation of the object trajectory, a representation of the object attributes, and a representation of detected events. The result is that the viewable video index may be transmitted to a low bandwidth application on a client device and may be used along with associated object and background models to generate a representation of the actual video data without requiring that the original video data itself be streamed to the client device.

26 Claims, 4 Drawing Sheets

U.S. PATENT DOCUMENTS

| | | | |
|---|---|---|---|
| 6,185,314 B1 * | 2/2001 | Crabtree et al. | 382/103 |
| 6,271,892 B1 * | 8/2001 | Gibbon et al. | 348/700 |
| 6,366,296 B1 | 4/2002 | Boreczky et al. | 345/719 |
| 6,385,772 B1 | 5/2002 | Courtney | 725/105 |
| 6,389,168 B2 | 5/2002 | Altunbasak et al. | 382/224 |
| 6,400,831 B2 * | 6/2002 | Lee et al. | 382/103 |
| 6,424,370 B1 | 7/2002 | Courtney | 348/143 |
| 6,560,281 B1 | 5/2003 | Black et al. | 375/240 |
| 6,614,847 B1 | 9/2003 | Das et al. | 375/240.16 |
| 2001/0035907 A1 | 11/2001 | Broemmelsiek | 348/169 |
| 2002/0008758 A1 | 1/2002 | Broemmelsiek et al. | 348/143 |
| 2003/0044045 A1 | 3/2003 | Schoepflin et al. | 382/103 |
| 2003/0081564 A1 | 5/2003 | Chan | 370/328 |
| 2003/0123850 A1 | 7/2003 | Jun et al. | 386/68 |
| 2003/0185434 A1 | 10/2003 | Lee et al. | 382/154 |

OTHER PUBLICATIONS

Wren et al., "Pfinder: Real-Time Tracking of the Human Body", IEEE Transactions on Pattern Analysis and Machine Intelligence, IEEE Inc., New York, vol. 19, No. 7, Jul. 1997, pp. 780-785.

Collins et al., "Algorithms for cooperative multisensor surveillance", Proceedings of the IEEE, vol. 89, No. 10, Oct. 2001, pp. 1456-1477.

Regazzoni et al., "3D pose estimation and shape coding of moving objects based on statistical morphological skeleton", Proceedings of the International Conference on Image Processing (ICIP), Washington Oct. 23-26, 1995, IEEE Comp. Soc. Press, vol. 3, Oct. 1995, pp. 612-615.

Foresti et al., "Statistical Morphological Skeleton for Representing and Coding Noisy Shapes", IEEE Proceedings: Vision, Image and Signal Processing, Institution of Electrical Engineers, GB, vol. 146, No. 2, Apr. 1999, pp. 85-92.

Senior et al., "Appearance Models for Occlusion Handling", Proceedings of the Second International Workshop on Performance Evaluation of Tracking and Surveillance Systems in Conjunction with CVPR'01, Dec. 2001, 8 pgs.

"Real-Time Articulated Human Body Tracking using Silhouette Information", IEEE Workshop on Performance Evaluation of Tracking and Surveillance, Nice, France, Oct. 2003, pp. 1-8.

* cited by examiner

SYSTEM AND METHOD FOR GENERATING A VIEWABLE VIDEO INDEX FOR LOW BANDWIDTH APPLICATIONS

BACKGROUND OF THE INVENTION

1. Technical Field

The present invention is generally directed to the fields of automatic video analysis and video compression. More specifically, the present invention is directed to a mechanism for performing automatic video analysis and video compression on video data provided by video input devices in order to generate representations of the video data using a low bandwidth data stream.

2. Description of Related Art

Video compression and automatic video analysis for tracking of moving objects are both very active areas of research. However, these have been disconnected areas of research. Video compression deals with minimizing the size of the video data in the video stream while video analysis is concerned with determining the content of video data.

In the context of video monitoring systems, such as video surveillance or security systems, the index data will alert the monitoring user to the presence of an interesting activity in the scene. However, in order to take an action, the user needs to view the corresponding video to gain a complete understanding of the activity. This feature is very essential since most automatic video analysis systems have errors in the event detection and will often indicate activity that is of little or no interest to the human being monitoring the video.

Current automatic video analysis systems analyze the video and generate an index. A typical video index may consist of a temporal reference into the video stream and a descriptor, where the descriptor may be a semantic token (e.g., the presence of a human face and cardinality) or a feature descriptor of the video (e.g., color histogram of the dominate objects). The implicit assumption of video indexing systems is that the actual video data will be available to the monitoring user when they choose to use the index to review the actual video. More information about such video analysis systems is available in the *Handbook of Video Databases, Design and Applications* by Fruth and Marques, CRC Press, 2003.

Many different types of video analysis systems have been devised for use in determining the content of video data. For example, U.S. Patent Application Publication No. 20030123850 to Jun et al. discloses a system that analyzes news video and automatically detects anchor person and other types of segments to generate temporal indices into the news video. The Jun systems uses the index information to provide content based access to the indexed segments and also allows for different reproduction speeds for different types of segments. This system requires both the index and the original video to allow a user to browse the news video.

U.S. Pat. No. 6,366,269, issued to Boreczky et al., describes a media file browser where the file is accessed based on a user selected feature. For example, a user may choose to jump to a point in the media file where there is an audio transition from music to speech or a visual transition from one scene to the other. This system also requires both the index and the original video to allow a user to browse the video content based on the index.

U.S. Pat. No. 6,560,281, issued to Black et al., is directed to a system which can analyze video data from a presentation, cluster frames into segments corresponding to each overhead slide used in the presentation, recognize gestures by the speaker in the video and use this information to generate a condensed version of the presentation. In this system, the condensed version of the video data can be used independently, i.e. without using the original video. However, the condensed version of the video data is not a complete representation of the original video.

U.S. Pat. No. 6,271,892, issued to Gibbon et al., describes a system that extracts key frames from video data and associates it with corresponding closed captioning text. This information may be rendered in a variety of ways, e.g., a page with printed key frames with associated closed captioning, to give a summary of the video. This system is in principle similar to the Black system discussed above and suffers the same drawback that the summary of the video is not a complete representation of the video data.

Current video surveillance and tracking systems analyze video to detect and track objects. They use the object tracking information to infer the occurrence of certain events in the video to thereby generate event markers. These systems then use these event markers as indices for viewing the original video.

For example, U.S. Pat. No. 5,969,755, issued to Courtney, describes a video surveillance system which incorporates object detection and tracking. The Courtney system generates a symbolic representation of the video based on the object tracking information. The Courtney system also uses the object tracking information to infer events in the video such as appearance/disappearance, deposit/removal, entrance/exit, etc. The Courtney system uses these event markers to retrieve relevant bits of the video for the user. The key drawback of the Courtney system, and systems like it, is that it requires both the index information, i.e. the event marker information, and the original video in order for the user to be able to make an independent assessment of the event.

U.S. Pat. No. 6,385,772, which is also issued to Courtney, describes a video surveillance system that uses a wireless link to transmit video to a portable unit. The video surveillance system uses motion detection as a trigger to transmit a video frame to the portable unit so that the user can make an assessment of the event. This system, while linking up a viewable representation of a detected event, does not provide a complete representation of the video corresponding to the event. Thus, the Courtney system limits the ability of the user to make assessments of the situation without accessing the original video footage.

U.S. Patent Application Publication No. 20030044045 to Schoepflin discloses a system for tracking a user selected object in a video sequence. In the Schoepflin reference an initial selection is used as a basis for updating both the foreground and background appearance models. This system, while discussing object tracking, does not address both the event detection problem and the problem of generating a complete representation of the video data.

U.S. Patent Application Publication No. 20010035907 to Boemmelsiek describes a video surveillance system which uses object detection and tracking to reduce the information in a video signal. The detected objects are used as a basis for generating events which are used to index the original video data. This system again has the drawback of requiring the original video data for the user to make an independent assessment of the detected event.

Current video compression systems are completely focused on reducing the number of bits required to store the video data. However, these video compression systems do not concern themselves with indexing the video in any form. For example, U.S. Patent Application Publication No. 20030081564 to Chan discloses a wireless video surveillance system where the data from a video camera is transmitted over a wireless link to a computer display. Such a system provides access to video data from the camera without any regard to event detection. Thus, this system requires that the user view the video in order to detect events himself.

U.S. Pat. No. 5,933,535, issued to Lee et al., teaches a method of using objects or object features as the basis for compression, as opposed to rectangular blocks. This results in higher compression efficiency and lower errors. This method, while using the object properties to reduce the bandwidth required to transmit the video data, does not look at the event behavior of the objects.

U.S. Pat. No. 6,614,847, issued to Das et al., discloses an object oriented video compression system which decomposes the video data in regions corresponding to objects and uses these regions as the basis for compression. However, this system, like most other compression systems, does not incorporate any video event information.

SUMMARY OF THE INVENTION

The critical drawback of current video analysis, video compression and video surveillance systems is their disjoint nature. That is, compression technology does not consider how the user gets the relevant portions of the video while video analysis and video surveillance technology generates relevance markers but assumes the presence of the original video data for the user to view the material.

The present invention addresses these problems in the prior art by providing a system and method for generating a viewable video index for low bandwidth application. The exemplary aspects of the present invention solve the problems with the prior art systems by incorporating a viewable representation of the video into the index, thus generating a viewable video index. The viewable video index contains a visual representation of moving objects in the video data, a visual representation of the background of the video capture area, i.e. the scene, a representation of the object trajectory, a representation of the object attributes, and a representation of detected events.

The visual representation of the video capture area background includes a color bit map of the scene background or stationary parts of the video capture area or scene. This color bit map is updated whenever the background changes appreciably as determined by a pre-established threshold. The background provides a static image of the environment in which moving objects, or foreground objects, move.

The visual representation of the moving objects includes a color bit map of all moving objects in the scene. The color bit map is updated at multiple time intervals during the lifetime of the object in the video capture area and may be superimposed on a background image in order to provide a representation of the moving object moving within the environment depicted by the background image.

The representation of the object trajectory includes a time synchronized representation of position of the object and its subparts over time. The representation of object attributes includes, but is not limited to, the type of object, the object size, object color, etc. The representation of the detected events includes a time synchronized representation of a variety of events that are detected in the video data. These may include the occurrence of movement, directional movement, etc.

Using the object trajectory information, the background images and the moving object bitmap, a representation of the video data may be generated in which the moving object bitmap images are superimposed over the background image and move across the background image in accordance with the trajectory information. In addition, a timeline representation with event markers corresponding to the sequence of events is provided with the event markers being selectable for jumping the representation of the video data to corresponding time points.

Thus, the viewable video index of the present invention provides a complete representation of the input video stream which can be used for distributed processing and after the fact event detection. The viewable video index makes use of models to represent foreground objects. These models may be generated by capturing an area around the points of movement within a series of video frames or may be pre-established models. Since the model data is provided along with the viewable video index, classification of the models into different types of objects, even those that were not envisioned at the time that the viewable video index was generated, may be made through an analysis of the model data.

In addition, since the viewable video index is a timestamped representation of a video capture area, the timestamps may be used to correlate the viewable video index with other types of timestamped information, whether generated by the same or a different system. Thus, for example, the viewable video index may be correlated with a security access card swiping device, badge reader, or keypad log file to determine an identity of a particular person within a video capture area represented by the viewable video index.

The viewable video index may be associated with a particular video capture device and may be marked with an identifier of the particular video capture device. In this way, by associating the identifier of the particular video capture device with information maintained regarding the layout of video capture devices at a particular location, "camera-handoff" for tracking an object as it crosses multiple video capture areas is made possible. These and other features and advantages of the present invention will be described in, or will become apparent to those of ordinary skill in the art in view of, the following detailed description of the preferred embodiments.

BRIEF DESCRIPTION OF THE DRAWINGS

The exemplary aspects of the present invention will best be understood by reference to the following detailed description when read in conjunction with the accompanying drawings, wherein.

DETAILED DESCRIPTION OF THE PREFERRED EMBODIMENT

Figure 1:
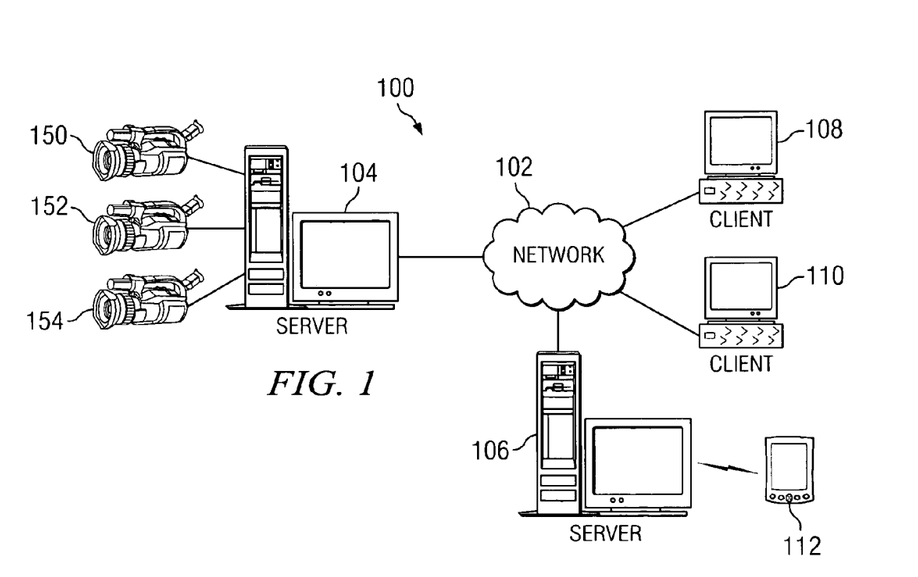
FIG. 1 is an exemplary diagram of a distributed data processing system in which the exemplary aspects of the present invention may be implemented.
Figure 2:
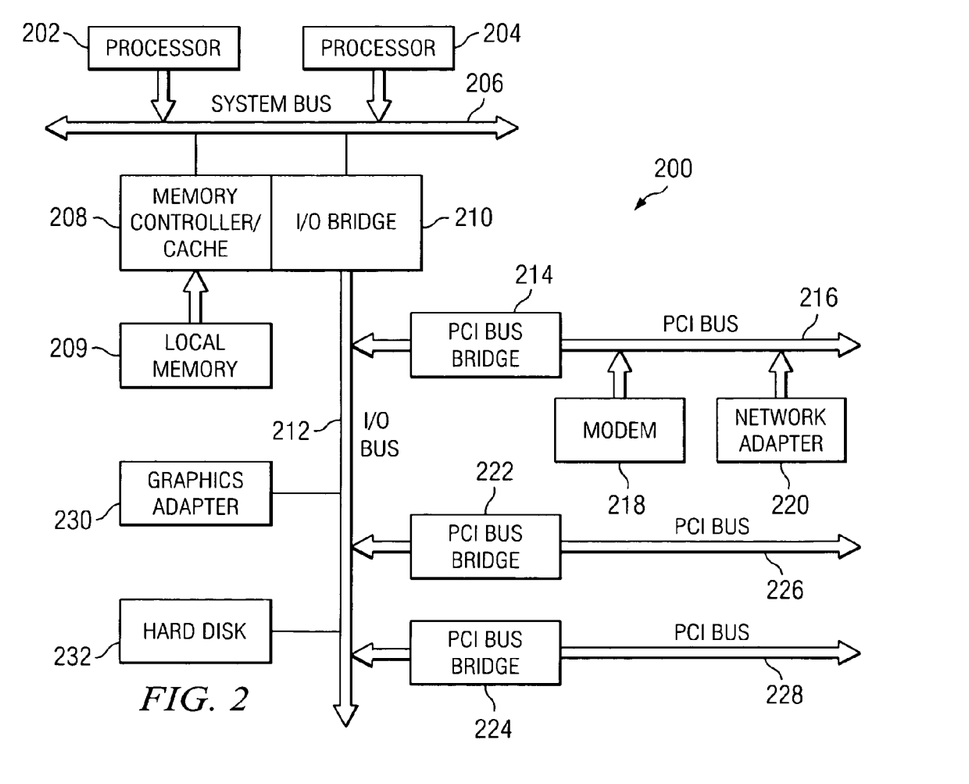
FIG. 2 is an exemplary diagram of a server computing device in which exemplary aspects of the present invention may be implemented.
Figure 3:
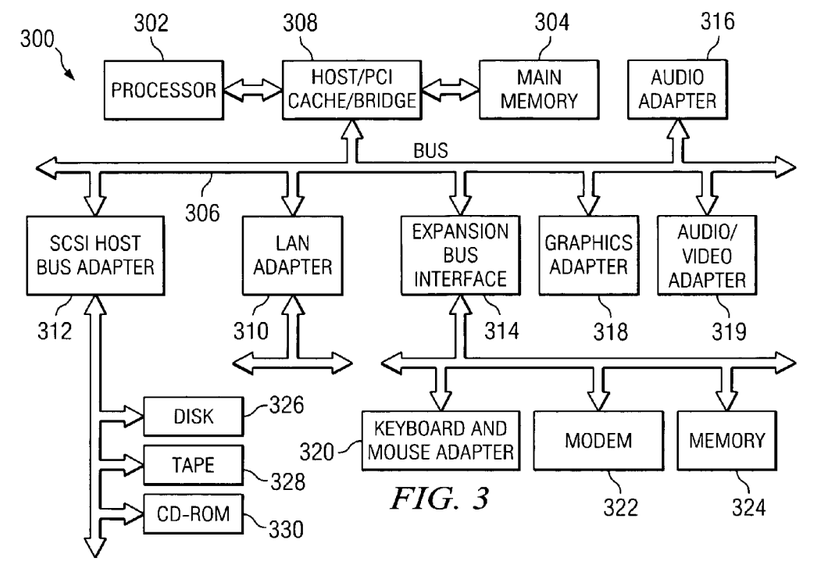
FIG. 3 is an exemplary diagram of a client computing device in which exemplary aspects of the present invention may be implemented.

The present invention provides a system and method for generating a viewable video index for low bandwidth applications. As such, the present invention is particularly well suited for use in distributed data processing systems in which data is transmitted, via wired and/or wireless connections, over a network between a plurality of computing devices. Therefore, the following FIGS. 1-3 are intended to provide a brief description of one exemplary distributed data processing system and the computing devices within this distributed data processing system as a context for the further description of the mechanisms of the present invention. The example systems and devices shown in FIGS. 1-3 are intended only as examples and no limitation on the systems or devices that may be used with the present invention is intended or implied by the depiction or description of FIGS. 1-3.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with wireless server 106. In addition, clients 108, 110, and 112 are connected to network 102. Clients 108 and 110 represent clients that communicate via the network 102 using wired connections to the network 102. Client 112 represents a client device, such as a personal digital assistant (PDA) or wireless telephone, that communicates with the network 102 using a wireless connection via the wireless server 106 which may be coupled to a base station or other type of wireless transceiver (not shown). These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

In the depicted example, server 104 may incorporate a viewable video index video analysis system in accordance with the exemplary aspects of the present invention. Server 104 may be coupled to one or more video input device 150-154 which are used to provide video data streams to the server 104. The video input devices 150-154 may be, for example, digital video cameras or the like. Alternatively, the video input devices 150-154 may provide video data streams from stored video data, such as in the case of a video tape player, DVD player, or other video data source having a storage medium upon which the video data may be recorded. The video data streams received from the video input devices 150-154 are analyzed to identify events occurring in the various video capture areas as well as to generate viewable video indices in the manner described hereafter.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

With reference now to FIG. 3, a block diagram illustrating a data processing system is depicted in which the present invention may be implemented. Data processing system 300 is an example of a client computer, such as client device 108, 110 or 112 in FIG. 1. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

With reference again to FIG. 1, as previously mentioned, the video input devices 150-154 provide video data streams to the server 104 which is equipped with a viewable video index video analysis system in accordance with the exemplary aspects of the present invention. The video data received from the video input devices 150-154 is analyzed by the viewable video index video analysis system to generate an adaptive background model which represents the static aspects of the video capture area in the video data. In addition, the video data is further analyzed to generate foreground appearance models that represent patches which correspond to moving objects in the video capture area in the video data. These patches are used along with the adaptive background model to generate a representation of the video data using a viewable video index.

Frames of the video data are analyzed to associate foreground objects, i.e. objects that move, between frames. In other words, the frames of the video data are analyzed to track object movements over time. The tracking of object movements over time may involve determining the position and size of the object over time, the orientation of the entire object over time, as well as parameters regarding subparts of the object. In some embodiments where models are used to track an object between frames, object classification may be performed based on an analysis of the video data so that an appropriate stored model for the object may be retrieved and used to represent the video data.

The analysis of the video data further includes detecting the occurrence of events that occur within the video capture areas of the video data. These events may include, for example, the occurrence of movement in a particular direction, occurrence of high speed movement, the occurrence of sudden changes in movement, etc. The event detection analysis according to the present invention may produce a sequence of time stamped events.

The result of the above analysis is used to generate a viewable video index. The viewable video index is generated based on user selected parameters that identify the composition of the viewable video index. These parameters may include, for example, the bandwidth requirement of the index and other parameters such as the control types of object representations that are included as part of the index, types of object activities that are included, etc. The generation of this viewable video index will be described in greater detail hereafter.

The viewable video index includes a plurality of data structures that reference the models and data generated through the above analysis. For example, the viewable video index may include a main index directory that references a log file that identifies start and end times of the video data represented by the viewable video index, a camera index directory that includes references to one or more track index files and object model files for foreground or moving objects. These track index files further include track start and end times indicating time points at which the corresponding objects in the object model files move within the video capture area as well as movement information indicating position and optionally, orientation and size information for the corresponding objects represented by the object models. The viewable video index further includes a background update directory that references one or more background image files that represent the static aspects of the video data.

Once this viewable video index is generated, it is stored in association with the actual video data and are used in generating a viewable representation of the video data. The viewable video index is stored in such a manner that it is made available for distribution over the network 102 to one or more client devices. In this way, the video data from the video input devices 150-154 is stored on the server along with the various object models, background model and tracking information and only the viewable video index needs to be distributed to a client device that may be used by a human user whose responsibility it is to monitor the video capture areas represented by the video data received from the video input devices 150-154.

Upon selection of an option to view the video corresponding to the viewable video index, the object models, background model, and tracking information is used to generate a representation of the video data. If the required models and tracking information are not present locally on the client device, these files may be downloaded to the client device via the network 102. If one or more of the files are already present on the client device, they need not be transmitted again. Instead they are retrieved from local storage and used in generating a viewable representation of the video data.

The viewable video index is used by the client device to determine how and where to superimpose the foreground model(s) on a background model and move the foreground model(s) across the background model in accordance with tracking information. In this way, only the data representative of models and tracking information needs to be downloaded for use with the viewable video index, and this may not be necessary every time the viewable video index is utilized, in order to generate a representation of the video data streamed to the server 104 from the video input devices 150-154. The start and end time stamps associated with the viewable video index may be used to correlate the viewable video index with corresponding time points in the actual video data. In this way, the user may obtain a viewable representation of the video data in order to determine whether further viewing of the actual video data is in order and may easily access the specific portion of the actual video data corresponding to the viewable video index.

Moreover, since only models, tracking information, and the viewable video index are necessary for generating the representation, the amount of data that must be transmitted to client devices is minimized. As a result, low bandwidth client devices, such as personal digital assistants or wireless telephones, may be used as client devices with the present invention.

Figure 4:
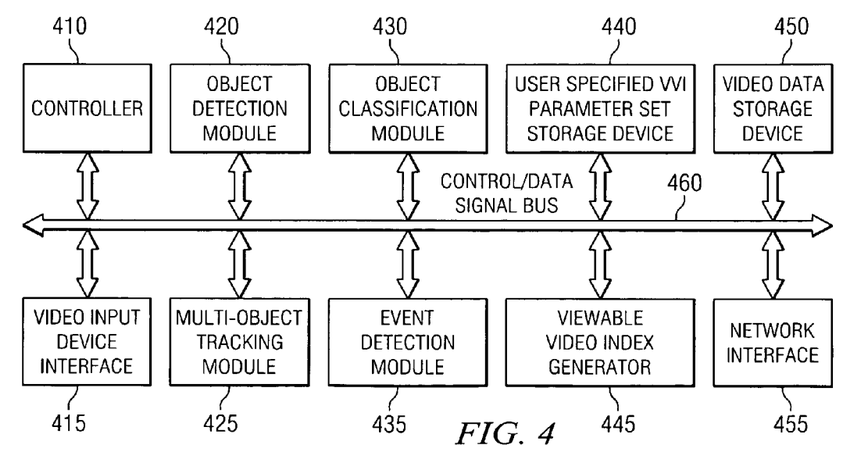
FIG. 4 is an exemplary block diagram illustrating a video analysis engine in accordance with one exemplary embodiment of the present invention.

FIG. 4 is an exemplary block diagram illustrating a video analysis engine in accordance with one exemplary embodiment of the present invention. It should be appreciated that the elements shown in FIG. 4 may be implemented as hardware, software, or any combination of hardware and software, without departing from the spirit and scope of the present invention. In one exemplary embodiment, the elements shown in FIG. 4 are implemented as software instructions executed by one or more data processing devices.

As shown in FIG. 4, the video analysis engine includes a controller 410, a video input device interface 415, an object detection module 420, a multi-object tracking module 425, an object classification module 430, an event detection module 435, a user specified viewable video index parameter set storage device 440, a viewable video index generator 445, a video data storage device 450, and a network interface 455. The elements 410-455 are in communication with one another via a control/data signal bus 460. Although a bus architecture is shown in FIG. 4, the present invention is not limited to such and any architecture that facilitates the communication of control/data signals between the elements 410-460 may be used without departing from the spirit and scope of the present invention.

Controller 410 controls the overall operation of the video analysis engine and orchestrates the operation of the other elements 415-460. The controller 410 receives video data via the video input device interface 415 and stores this video data in the video data storage device 450. In addition, this video data may be provided to the other modules 420-435 for analysis.

The object detection module 420 performs object detection for identifying moving objects in the received video data. The detection of moving objects may be performed in any known manner. For example, a plurality of frames of video data at successive time points may be analyzed to determine differences. A comparison of the differences with pre-established thresholds is utilized to determine if the differences are likely representative of a moving object. The portions of the video data corresponding to the differences are then identified as a moving object. Of course, many other methods for identifying moving objects, some of which are described in the prior art reference in the Background of the Invention section, may be utilized without departing from the spirit and scope of the present invention.

The present invention uses this identification of moving objects to separate out foreground objects, i.e. moving objects, from the static portions of the video data, i.e. the background. A frame of the background video data that does not include the foreground object(s) is stored as an adaptive background model. Periodically, a frame of the background video data may be compared to the currently stored adaptive background model to determine if the background has changed appreciably. This may be done by determining differences between the frame and the stored adaptive background model and determining if these differences exceed an established threshold.

The identified foreground objects are used to generate patches or overlays that represent the foreground objects. The generation of these patches or overlays may be based on a graphical representation of the object extracted from the video data, a generated graphical representation of the object based on attributes identified through analysis of the video data, an object model retrieved based on classification of the object, or the like. In a preferred embodiment, the object patches or overlays are generated by identifying attributes of the object, such as size, color, configuration, etc., and comparing them to attributes of stored object types in order to classify the object as a particular type of object. Thereafter, an object model corresponding to the identified object type is utilized to represent the object. An example of one method by which an object model may be generated for use in representing an object is described in Senior et al., "Appearance Models for Occlusion Handling," Proceedings of Second International Workshop on Performance Evaluation of Tracking and Surveillance Systems in conjunction with CVPR'01, December 2001, which is hereby incorporated by reference.

Having identified the foreground objects and the background of the received video data, the object patches or overlays and the adaptive background model are stored in association with the video data in the storage device 450. The multi-object tracking module 425 receives the foreground object and background information and tracks the trajectory of the foreground objects as they move over the background in the received video data from frame to frame. The multi-object tracking module 425 may use any one or a combination of several processes for tracking objects over time. For example, as described in Senior et al. "Appearance Models for Occlusion Handling," Proceedings of Second International Workshop on Performance Evaluation of Tracking and Surveillance Systems in conjunction with CVPR'01, December 2001, foreground objects are described by a bounding box and an image mask which indicates those pixels in the bounding box that belong to the foreground. In the Senior et al. system, a distance matrix showing the distance between each of the foreground objects and all the currently active tracks is constructed in order to associated the foreground objects with one of the existing tracks in successive frames. For more complex structures in the track matrix produced by the bounding box tracking of Senior et al., appearance based modeling is used. This is but one example of the way in which foreground objects may be tracked, other methods and mechanisms may be used without departing from the spirit and scope of the present invention.

Based on the type of object model used to represent the foreground objects, various parameters of the object may be estimated by the multi-object tracking module 425 at various time points. For example, if the multi-object tracking module 425 uses a position and size tracker mechanism, such as that described in Senior et al. "Real-time Articulated Human Body Tracking Using Silhouette Information," IEEE Workshop on Performance Evaluation of Tracking and Surveillance, Nice, France, October, 2003, which is hereby incorporated by reference, an estimate of the position and size of the object at various time points may be generated. The result of such estimations is a sequence of time stamped position and size values for each unique moving object in the video data. If the multi-object tracking module 425 uses a model based tracker, such as that described in the Senior et al. system, the model that is identified through the classification discussed above may be used as a basis for tracking multiple object parameters from one time point to the next. Such model based tracking mechanisms allow multiple parameters of the object to be estimated including the size, position, and orientation of the entire object and similar parameters for subparts of the object. For example, a person tracker could estimate the pose of the person's head, the position and size of the person's torso and limbs, and the like. Depending on the complexity of the tracking mechanism, multiple time stamped parameter sets may be generated.

While this tracking is being performed, the trajectory information is analyzed to determine if events of interest occur. As noted above, such events may include, for example, movement in a particular direction, the occurrence of high speed movement, occurrence of sudden changes in movement, and the like. Thus, the multi-object tracking module 425 generates a trajectory for each foreground object and a sequence of time stamped events. The trajectory and event information generated by the multi-object tracking module 425 is stored in the storage device 450 in files associated with the various identified foreground objects. There are a variety of events that can be detected. As one example, a directional motion event may be detected. Here the user specifies a target movement direction (as an angle). The system computes the dominant direction of movement for each moving object. This is done by measuring the incremental movement direction (using two position measurements), these incremental directions are used to compute a histogram, the peak of the histogram is used to determine the direction of movement of the object. Once the direction of movement of the object is known, it is compared to the user supplied direction. If the object movement direction is within a specified tolerance of the user specified direction, a directional-movement event is declared. Of course this is but one example of an event that may be detected using the present invention and other events may be defined and detected without departing from the spirit and scope of the present invention.

The viewable video index generator 445 receives information identifying the foreground object patches or layovers, the adaptive background model, the trajectory and event information, and user specified viewable video index parameter set information, and generates a viewable video index from this information. The viewable video index generator 445 generates a data structure having a main index directory that identifies attributes about the portion of video data to which the viewable video index corresponds, a video input device index directory that identifies the foreground object patch or layover files and the trajectory and event information files corresponding to the foreground objects, and a background update directory that identifies the background image files that correspond to the background for the portion of video data represented by the viewable video index, as discussed hereafter. The identifiers in the viewable video index may be, for example, filenames, Internet protocol addresses, file pathnames, and the like.

The content of the viewable video index may be governed by user specified parameters. These user specified parameters may identify, for example, the bandwidth requirement for the viewable video index which in turn determines the amount and kind of information that may be contained within the viewable video index. That is, for lower bandwidth applications, the viewable video index may not be able to include all of the information that would be available for higher bandwidth applications.

Once the viewable video index (VVI) is generated by the VVI generator 445, the VVI is stored in association with the originally received video data, model information, and tracking information in the storage device 450. Either immediately when available, periodically, or upon request, the stored VVI may be transmitted to a client device via the network interface 455. In addition, if necessary, model data and tracking data associated with the VVI may be transmitted to the client device via the network interface 455. The model data and tracking data may be sent in response to a request being received from a client device, for example.

At the client device, the VVI is used by an index browser application to generate a representation of the video data at the client device. The VVI is used to correlate the model data and tracking data to generate the representation of the video data. Based on the VVI, the model information and the tracking information, a display of the background with superimposed object models is generated. The superimposed object models are moved across the background in accordance with the tracking information. In addition, a representation of a timeline represented by the VVI may be generated with event identifiers provided. The user of the client device may select the event identifiers in order for the representation of the video data to jump to a representation of the video corresponding to the event start time for the selected event. Since the tracking information is a time stamped trajectory and a time stamped sequence of events, the time stamps may be used to correlate the events and trajectory information to determine where and how the foreground object patches or overlays are to be placed over the background model representation.

Since the generation of the representation of the video data requires the use of background models, foreground models, tracking information, and the like, it is important that this information be locally accessible by the client device. If this information is not current stored in the client device, it may be downloaded from the storage device 450. If the information is already present locally, there is no need to download the information from the storage device 450. Thus, the present invention minimizes the amount of data that needs to be transmitted to the client device by eliminating the need to transmit the actual video data and by only requiring model information to be downloaded to the client device when it is not already present locally at the client device. As a result, low bandwidth applications on client devices may be utilized to generate the representation of the video data on the client device. This permits client devices such as personal digital assistants and wireless communication devices to be used as devices through which a user may monitor the video capture areas of the various video input devices.

Figure 5:
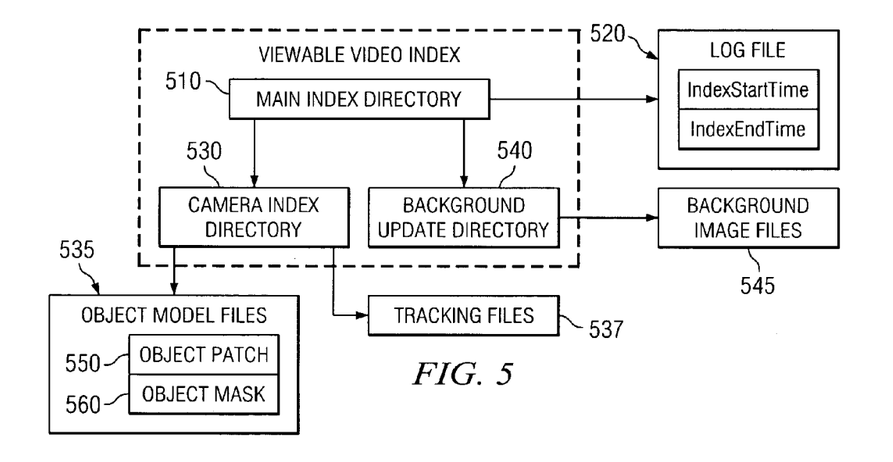
FIG. 5 is an exemplary diagram illustrating an example of the structure of a viewable video index for a sampled video stream generated by a video analysis engine in accordance with one exemplary embodiment of the present invention.

FIG. 5 is an exemplary diagram illustrating an example of the structure of a viewable video index for a sampled video stream generated by a video analysis engine in accordance with one exemplary embodiment of the present invention. As shown in FIG. 5, the viewable video index (VVI) includes a main index directory 510 that references a log file 520, a camera index directory 530, and a background update directory 540. The main index directory may further include information identifying general parameters for outputting a viewable video index such as the types of encryption used for the index files, the version number of the index, the video source name and characteristics from which the index was derived, and the like.

The log file 520 referenced by the main index directory 510 includes an index start time and an index end time for the viewable video index. The log file 520 encodes global properties of the viewable video index. The log file 520 may include, for example, statistics summarizing the activity in the index, such as the total number of objects in the scene, distribution of objects by type, etc.

The camera index directory 530 includes references to object model files 535 and their corresponding tracking files 537. The object model files include an object patch 550 or overlay and an object mask 560. The object mask 560 is used to remove a portion of the background model for use in superimposing the object patch 550. The corresponding tracking files 537 consist of index data for each frame of the video. There may be separate tracking files 537 for each object or a single tracking file that includes references to each foreground object, depending on the particular implementation.

Figure 6:
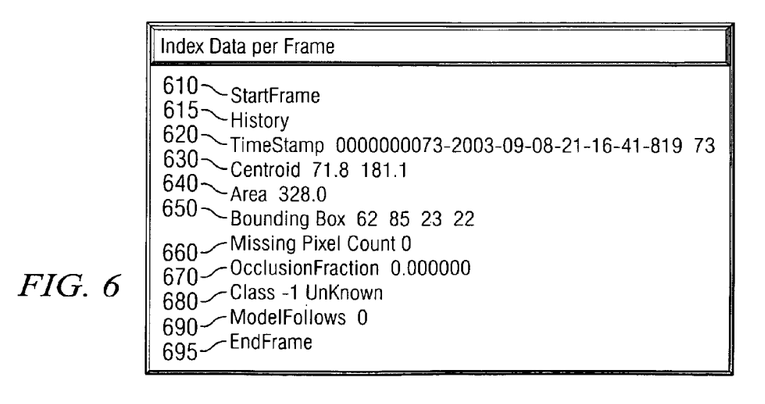
FIG. 6 is an exemplary diagram illustrating details of an index entry at a given time instant for a sampled video stream in accordance with one exemplary embodiment of the present invention.

An example of the index data for frames of the video that may be included in the tracking files is shown in FIG. 6. As shown in FIG. 6, the index data may include, for example, a start frame identifier 610, a timestamp for the frame 620, a centroid location 630 for the frame, an area 640 of the frame, bounding box parameters 650, a missing pixel count 660, an occlusion fraction 670, an object class 680, a model track number 690, and an end frame identifier 695. The above elements represent various properties of the objects that are being tracked at any given time instant. For example, the time stamp 620 represents the time at which the index data was gathered, the centroid location 630 is the location of the object in the image frame, the area 640 represents the extent of the object in pixels, etc. This list of properties can be changed based on the index parameters set by the user.

The background update directory 540 references one or more background image files that are used to represent the background of the video data. If the background changes appreciably during the time interval represented by the viewable video index, more than one background image file may be referenced in the background update directory 540. In addition, timestamps may be associated with the background image files to determine when to change the background file that is used to generate the representation of the video data.

Figure 7:
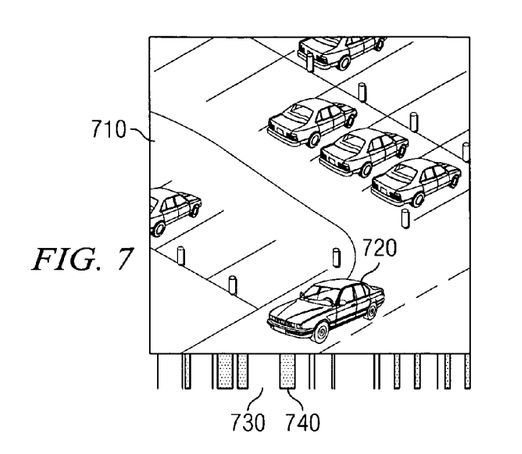
FIG. 7 is an exemplary diagram of a visual output generated based on a viewable video index in accordance with one exemplary embodiment of the present invention.

As mentioned above, the information contained in the viewable video index shown in FIG. 5 is used to generate a representation of the video data. FIG. 7 is an exemplary diagram of a visual output generated based on a viewable video index in accordance with one exemplary embodiment of the present invention.

As shown in FIG. 7, the video representation includes a background image 710 with a superimposed foreground object model patch or overlay 720 that represents a moving object in the video data. In addition, a timeline representation 730 is provided with event markers 740 identifying portions of the video data represented by the viewable video index where events were detected to have occurred.

As the video representation is viewed, the superimposed foreground model patch or overlay 720 may be moved across the background image in accordance with the tracking information identified in the viewable video index. In addition, the superimposed foreground object model patch may have its size, orientation, and other parameters modified in accordance with the parameters recorded with the tracking information as previously described above. In this way, a representation of the video data is generated from a static background image and models of foreground or moving objects.

Other characteristics of the viewable video index may be displayed on the video representation. For example, a trail may be displayed indicating the movement of the superimposed foreground object model patch or overlay 720. Other information, including timestamp information and the like may be displayed in the video representation.

As mentioned above, the timeline representation 730 includes the event markers 740 based on the sequence of events indicated in the tracking files. These event markers 740 are selectable so that the video representation may be jumped to a video representation corresponding to the start timestamp associated with the selected event marker.

Thus, the video representation provides enough information for a user to view the video representation and determine if there is sufficient reason to view the actual video data to determine if something of interest has occurred within the video capture area of the video input device. This is done while minimizing the amount of data that needs to be transmitted to the client device. The need to actually transmit the video data to the client device is avoided. A much smaller amount of data including the viewable video index, model data, and the tracking files are all that is necessary to generate a representation of the video data.

Figure 8:
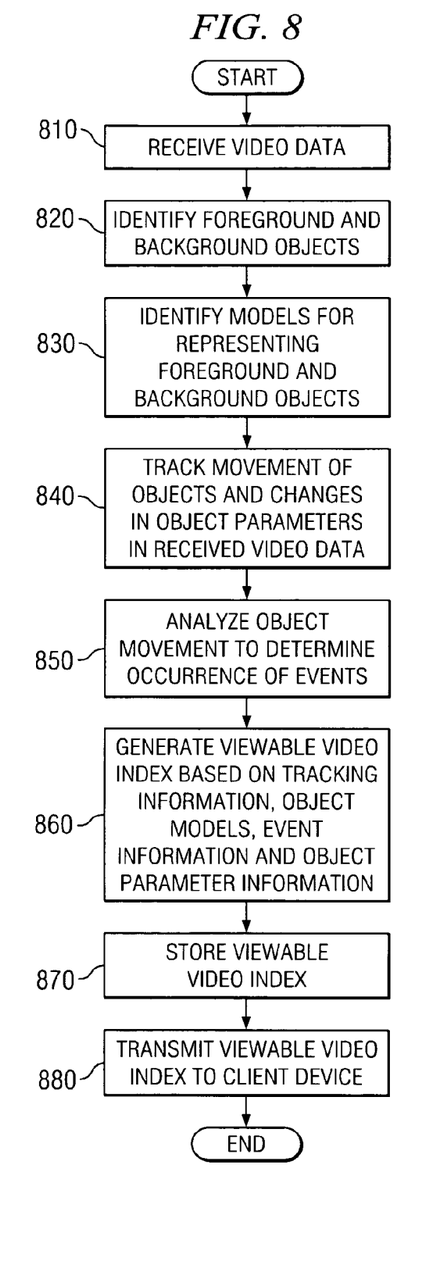
FIG. 8 is a flowchart outlining an exemplary operation of one exemplary embodiment of the present invention when generating a viewable video index.
Figure 9:
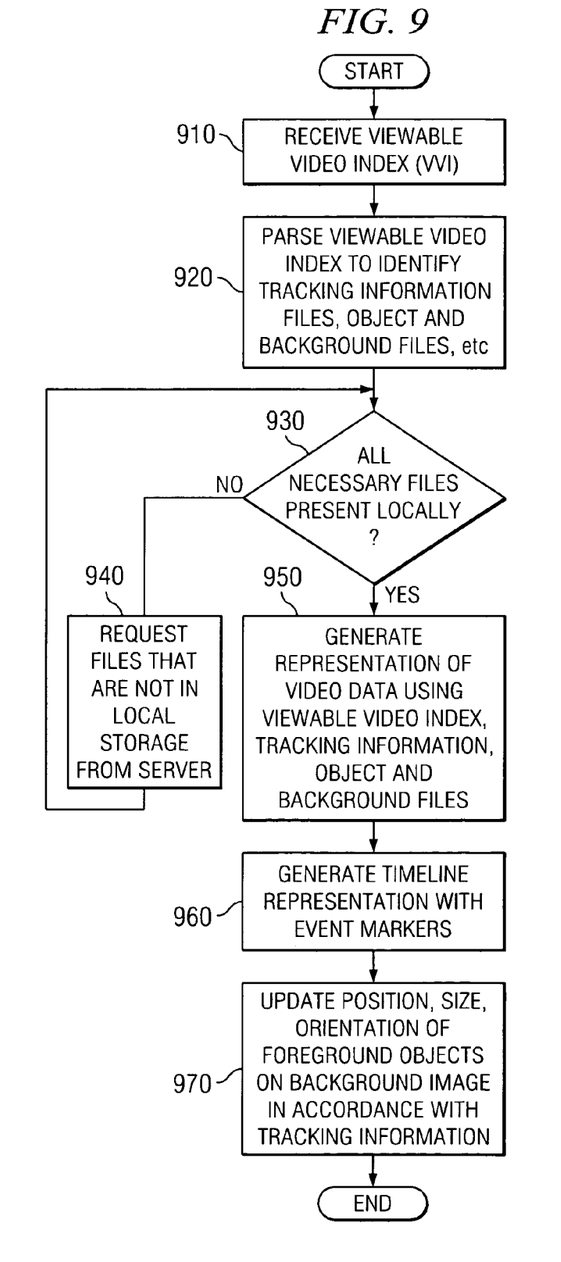
FIG. 9 is a flowchart outlining an exemplary operation of one exemplary embodiment of the present invention when generating a visual output using a viewable video index.

FIGS. 8 and 9 illustrate flowcharts outlining exemplary operations of various elements of the present invention. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

FIG. 8 is a flowchart outlining an exemplary operation of one exemplary embodiment of the present invention when generating a viewable video index. As shown in FIG. 8, the operation starts by receiving video data (step 810). Foreground and background elements of the video data are identified (step 820) and models representing the foreground objects and background elements are generated (step 830).

Movement of the foreground objects over the background is then tracked for a predetermined period to generate tracking and object parameter information (step 840). In addition, the video data is analyzed to determine the occurrence of events and a sequence of events is generated (step 850). The models, tracking and event information are then utilized to generate a viewable video index (step 860) by generating a data structure with parameters and references to the model, tracking and event files. The viewable video index is then stored (step 870) and may be transmitted to a client device (step 880). The operation then ends.

FIG. 9 is a flowchart outlining an exemplary operation of one exemplary embodiment of the present invention when generating a visual output using a viewable video index. As shown in FIG. 9, the operation starts by receiving, or retrieving from local storage, a viewable video index (step 910). The viewable video index is then parsed to identify the tracking information files, foreground or moving object files, background files, and the like, that are referenced in the viewable video index (step 920). A determination is made as to whether any of the files referenced in the viewable video index are not present locally (step 930). This may be done by comparing the filenames (and optionally the paths) in the viewable video index with a designated storage location on a local storage device to determine if a file with the corresponding filename exists in the local storage device. If any of the files are not present in the local storage device, and a request for the files has not been previously sent within a predetermined period of time, then they are requested from the viewable video index server via a network interface (step 940).

The operation then returns to step 930 and continues to check for the files in the local storage device. Once all of the necessary files referenced in the viewable video index are available locally, a representation of the video data is generated by superimposing the moving object images from the moving object files, at the position identified in the tracking information file, on the background image (step 950). A timeline representation may also be generated that includes event markers indicating time points at which events were detected in the input video data stream (step 960). As mentioned previously, these event markers are selectable in order to jump the representation of the video data to a time point corresponding to the start time of the detected event. The position, size, orientation, and the like, of the moving objects are updated as the representation steps through the time sequence indicated in the tracking information file or in response to the selection of an event marker (step 970). The operation then terminates.

Thus, the present invention provides a mechanism for reducing an input video data stream to a viewable video index, one or more background and moving object model or image files, and a tracking file. In this way, only the viewable video index, the model or image files, and the tracking file need to be transmitted to the client device in order for a representation of the original input video data stream to be generated at the client device. This allows the user of the client device to view the representation in order to obtain greater understanding of the events occurring in the original input video data stream. Based on viewing the representation of the input video data stream, the user may then determine whether further investigation of the depicted events is warranted.

The viewable video index of the present invention provides a complete representation of the input video stream which can be used for distributed processing and after the fact event detection. The viewable video index makes use of models to represent foreground objects. These models may be generated by capturing an area around the points of movement within a series of video frames or may be pre-established models. Since the model data is provided along with the viewable video index, classification of the models into different types of objects, even those that were not envisioned at the time that the viewable video index was generated, may be made through an analysis of the model data. For example, if at the time that the viewable video index is generated, only people and vehicles are established classifications of objects, and later subcategories of trucks and cars are established within the vehicles classification, the model data itself may be re-analyzed based on parameters defining trucks and cars to determine whether the object that was originally classified as a vehicle, is either a truck or a car.

In addition, since the viewable video index is a timestamped representation of a video capture area, the timestamps may be used to correlate the viewable video index with other types of timestamped information, whether generated by the same or a different system. Thus, for example, the viewable video index may be correlated with a security access card swiping device, badge reader, or keypad log file to determine an identity of a particular person within a video capture area represented by the viewable video index. The system of the present invention may be coupled to databases in which such timestamped information is stored and may access this information in order to perform such correlations and provide an output to a user indicative of the correlations, if any, between the viewable video index and these other sources of information.

The viewable video index may also be associated with a particular video capture device and may be marked with an identifier of the particular video capture device, i.e. a camera identifier may be stored in association with a viewable video index generated based on an input video stream from that camera. A data structure may be maintained that indicates the orientation of a plurality of video capture devices in a particular area and the positional relationship between these video capture devices. This information may be correlated with the movement of the objects represented by the viewable video index to determine to which video capture area the object moved when it moves outside of the current video capture area. In this way, by associating the identifier of the particular video capture device with information maintained regarding the layout of video capture devices at a particular location, "camera-handoff" for tracking an object as it crosses multiple video capture areas is made possible. These and other uses and implementations of the present invention as are apparent to those of ordinary skill in the art in view of the above description, are intended to be within the spirit and scope of the present invention.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for representing an input video data stream on a computing device, comprising:
   receiving the input video data stream;
   identifying a background image and at least one moving object in the input video data stream;
   tracking at least one parameter of the at least one moving object over time in the input video data stream to thereby generate tracking information;
   determining user selected parameters for generation of a viewable video index, wherein the user selected parameters include a bandwidth requirement for the computing device;
   generating the viewable video index based on the user selected parameter, wherein the viewable video index identifies the tracking information, the at least one moving object and the background image, and wherein generating the viewable video index based on the user selected parameters includes determining at least one of an amount and a type of information that may be included in the viewable video index based on the bandwidth requirement; and
   transmitting the viewable video index to the computer device.

2. The method of claim 1, wherein the at least one parameter of the at least one moving object includes a position of the at least one moving object, a size of the at least one moving object, and an orientation of the at least one moving object.

3. The method of claim 1, wherein the viewable video index identifies a model to be used when generating a representation of the at least one moving object.

4. The method of claim 1, further comprising:
   receiving the viewable video index at the computing device; and
   generating a graphical representation of the input video data stream based on the viewable video index.

5. The method of claim 4, wherein generating a graphical representation of the input video data stream includes superimposing a model of the at least one moving object over the background image and moving the model over the background image in accordance with the tracking information.

6. The method of claim 4, wherein generating a graphical representation of the input video data stream based on the viewable video index includes:
   determining if either the tracking information, the background image or a model of the at least one moving object are not present locally on the computing device; and
   transmitting a request to a source of the viewable video index for either the tracking information, the background image or the model of the at least one moving object if either the tracking information, the background image or the model is not present locally on the computing device.

7. A method, in a data processing system, for generating a representation of a video data stream, comprising:
   receiving a viewable video index corresponding to a portion of the video data stream, wherein the viewable video index correlates tracking information with foreground object information and background object information;
   determining if either a foreground object model, a background image, or the tracking information is not present in a local storage device;
   requesting the foreground object model, the background image, or the tracking information from a source of the viewable video index if either the foreground object model, the background image or the tracking information is not present in the local storage device.
   superimposing the foreground object model over the background image based on the foreground object information and background object information in the viewable video index; and
   graphically moving the foreground object model over the background image based on the tracking information.

8. The method of claim 7, further comprising:
   retrieving either the foreground object model, the background image, or the tracking information from the local storage device rather than sending a request to the source of the viewable video index, if either the foreground object model, the background image, or the tracking information is stored in the local storage device.

9. The method of claim 7, wherein the video data stream is not received prior to generating the representation of the video data stream.

10. The method of claim 7, further comprising:
    parsing the tracking information for event information; and
    generating a graphical timeline with event markers based on the tracking information and event information.

11. The method of claim 10, wherein the event markers are selectable to thereby jump the representation of the video data stream to a time point corresponding to a selected event marker.

12. The method of claim 7, wherein the background object information includes information indicating when a background image is to be changed in the representation of the video data stream, and wherein superimposing a foreground object model over a background image includes changing the background image from a previous background image to a current background image based on the information indicating when the background image is to be changed.

13. A computer readable medium encoded with a computer program for representing an input video data stream on a computing device, wherein the computer program product comprises:
    first instructions for receiving the input video data stream;
    second instructions for identifying a background image and at least one moving object in the input video data stream;
    third instructions for tracking at least one parameter of the at least one moving object over time in the input video data stream to thereby generate tracking information;
    fourth instructions for determining user selected parameters for generation of the viewable video index, wherein the user selected parameters includes bandwidth requirement for the computing device;
    fifth instructions for generating a viewable video index based on the user selected parameters, wherein the viewable video index identifies the tracking information, the at least one moving object and the background image; and sixth instructions for transmitting the viewable video index to the computing device.

14. The computer program product of claim 13, wherein the at least one parameter of the at least one moving object includes a position of the at least one moving object, a size of the at least one moving object, and an orientation of the at least one moving object.

15. The computer readable medium of claim 13, wherein the viewable video index identifies a model to be used when generating a representation of the at least one moving object.

16. The computer readable medium of claim 13, wherein the computer program further comprises:
    seventh instructions for receiving the viewable video index at the computing device; and
    eighth instructions for generating a graphical representation of the input video data stream based on the viewable video index.

17. The computer program product of claim 16, wherein the eighth instructions for generating a graphical representation of the input video data stream include instructions for superimposing a model of the at least one moving object over the background image and moving the model over the background image in accordance with the tracking information.

18. The computer program product of claim 16, wherein the eighth instructions for generating a graphical representation of the input video data stream based on the viewable video index include:
    instructions for determining if either the tracking information, the background image or a model of the at least one moving object are not present locally on the computing device; and
    instructions for transmitting a request to a source of the viewable video index for either the tracking information, the background image or the model of the at least one moving object if either the tracking information, the background image or the model is not present locally on the computing device.

19. A computer readable medium encoded with a computer program for generating a representation of a video data stream, comprising:
    first instructions receiving a viewable video index corresponding to a portion of the video data stream, wherein the viewable video index correlates tracking information with foreground object information and background object information;
    second instruction for determining if either a foreground object model, a background image, or the tracking information is not present in a local storage device; and
    third instructions for requesting either the foreground object model, the background image, or the tracking information from a source of the viewable video index if either the foreground object model, the background image or the tracking information is not present in the local storage device.
    fourth instructions superimposing the foreground object model over the background image based on the foreground object information and background object information in the viewable video index; and
    fifth instructions for graphically moving the foreground object model over the background image based on the tracking information.

20. The computer program product of claim 19, further comprising:
    sixth instructions for retrieving either the foreground object model, the background image, or the tracking information from the local storage device rather than sending a request to the source of the viewable video index, if either the foreground object model, the background image, or the tracking information is stored in the local storage device.

21. The computer program product of claim 19, wherein the video data stream is not received prior to generating the representation of the video data stream.

22. The computer readable medium of claim 19, further comprising:
    sixth instructions for parsing the tracking information for event information; and
    seventh instructions for generating a graphical timeline with event markers based on the tracking information and event information.

23. The computer program product of claim 22, wherein the event markers are selectable to thereby jump the representation of the video data stream to a time point corresponding to a selected event marker.

24. The computer readable medium of claim 19, wherein the background object information includes information indicating when a background image is to be changed in the representation of the video data stream, and wherein superimposing a foreground object model over a background image includes changing the background image from a previous background image to a current background image based on the information indicating when the background image is to be changed.

25. An apparatus, for representing an input video data stream on a computing device, comprising:
    means for receiving the input video data stream;
    means for identifying a background image and at least one moving object in the input video data stream;
    means for tracking at least one parameter of the at least one moving object over time in the input video data stream to thereby generate tracking information;
    means for determining user selected parameters for generation of a viewable video index, wherein the user selected parameters include a bandwidth requirement for the computing device;
    means for generating the viewable video index based on the user selected parameter, wherein the viewable video index identifies the tracking information, the at least one moving object and the background image, and wherein generating the viewable video index based on the user selected parameters includes determining at least one of an amount and a type of information that may be included in the viewable video index based on the bandwidth requirement; and
    means for transmitting the viewable video index to the computing device.

26. An apparatus for generating a representation of a video data stream, comprising:
    means for receiving a viewable video index corresponding to a portion of the video data stream, wherein the viewable video index correlates tracking information with foreground object information and background object information;
    means for determining if either a foreground object model, a background image, or the tracking information is not present in a local storage device;

means for requesting either the foreground object model, the background image, or the tracking information from a source of the viewable video index if either the foreground object model, the background image or the tracking information is not present in the local storage device;

means for superimposing the foreground object model over the background image based on the foreground object information and background object information in the viewable video index; and means for graphically moving the foreground object model over the background image based on the tracking information.

\* \* \* \* \*